May 17, 1949. J. VERNER 2,470,418
OIL SKIMMING DEVICE
Filed April 25, 1945
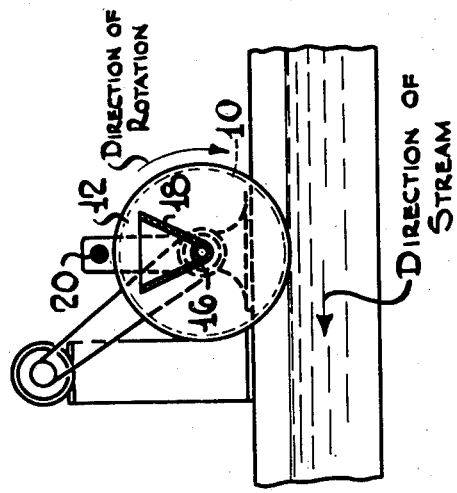
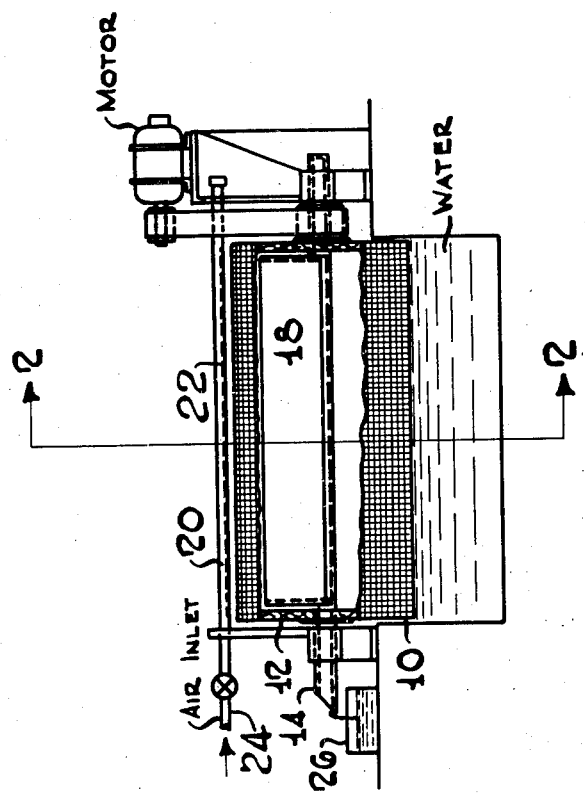
Jules Verner Inventor
By Young Attorney Patented May 17, 1949

2,470,418

UNITED STATES PATENT OFFICE 2,470,418

OIL SKIMMING DEVICE

Jules Verner, Linden, N. J., assignor to Standard Oil Development Company, a corporation of Delaware Application April 25, 1945, Serial No. 590,215

5 Claims. (Cl. 210—51)

This invention relates to a method and device for removing films of water-immiscible organic oily impurities from water, and in particular to a device for separating waste oil from petroleum refinery effluent water.

Water is commonly employed as a washing medium for oils in many types of petroleum refining operations. Thus, water having small quantities of oil on the surface is passed to the refinery sewers and makes its way to nearby natural waterways. The oil present on the water must be separated before passing into these waterways. Numerous devices have been proposed for skimming the oil from the surface before such streams are passed into the waterways. All such devices have the disadvantage of failing to separate satisfactorily the oil from the water under tidal and seasonal changes. The devices constructed according to the present invention are, as a class, a definite improvement in this connection and accomplish efficient separation of oil from water without the treatment of large volumes of contaminated water. The oily impurities removed by the method of this invention include all oils which are immiscible with water, such as mineral and/or vegetable oils present usually as a thin film of oil on water of amount less than a fraction of a per cent of the oil.

It is an object of this invention to remove effectively and economically oil films from industrial oil-contaminated effluent streams, to render the treated waters acceptable for disposal in natural waterways, and to recover the oil as may be desirable. The device of the present invention is based essentially upon the preferential adhesion of oily materials over water for metallic screening of fine mesh such as common mosquito screen fabricated from strands of copper or other corrosion-resistant material such as Monel metal and such alloys. When such a wire mesh screen is deployed over the surface of the oil-coated water, the oil is removed in preference to water. When the screen holding the oil is then passed under an air or steam current, the oil can easily be separated from the screen. The mesh screen can be of single or multiple layer construction, attached for suitable operation in the form of a drum as a continuous belt contacting the oil-water surface some distance below the oil surface. The particular metallic character and size of the mesh of the screen depends upon the type of oil in the film, especially as to the presence of impurities in the water which may effect the solubilizing action of the water for the oil. When the mesh is of multi-layer construction, it has been found particularly advantageous to have the various layers distinctly separated such as at about ¼" separation. For refinery waste oil as occurring in petroleum refinery separators, mosquito screen mesh of copper, Monel metal or other such corrosion-resistant alloy wire strands has been found advantageous. Such a screen, when immersed in the water to contact the oil-water interface, has been found to remove the oil from the surface of the water. This effect is particularly good when more than one layer of screen is employed, the oil removed in such cases being all except the slightest traces responsible for coloration on the surface of the water.

An embodiment of the invention involves having a mosquito screen mesh wire connected in the form of a cylinder and held upon discs at the open ends. Such an embodiment of the invention is shown in Figures 1 and 2, Figure 1 being a cross-sectional view, and Figure 2 being an end view of such a device.

In the drawings, a mosquito screen mesh 10, of copper wire in this case, is shown as being connected at either end to circular discs 12 made of corrosion-resistant material. The inner dotted line in Figure 2 indicates that the mesh screen in this embodiment is of multiple layer construction. The discs rotate upon a stationary pipe shaft 14 which has a continuous slot 16 along the top and into which is inserted a continuous funnel-shaped trough 18 for the full length of the screen. Over the top of the drum, a small pipe 20, capped on the end with a $\frac{1}{32}$" slot 22 facing the drum, is held in place and air is blown from the connection 24 through the slot onto the screen immediately below the pipe so that while the air blows the oil accumulated on the screen and filming across its diverse openings passes into the funnel within the drum. The funnel conducts the oil into the hollow shaft 14 from which it flows into a container 26 for collection to be pumped away as desired.

The mesh and metallic character of the screen will vary according to the type of oil which has to be separated and any oil-aqueous solution inter-solubility relationships. In this connection, it is important that the screen be made of such material as is most effective from these viewpoints and also when in contact with the corrosive solutions of such character as an alloy which will withstand any corrosive influences. Also, the volume and pressure of the air blast on the top of the screen will vary according to the mesh and the nature of the oil.

It has been found that with a device such as illustrated in Figures 1 and 2, oil can be advantageously separated from refinery separators at the separator outlets to the natural waterways and along the waterfront dockage where oil spills often occur. Thus, in Figure 1, the mesh 10 may be viewed as the front portion of a continuous or endless belt moving upon a roller whose ends are the circular discs 12. Also, such units may be installed in such positions in series in such numbers as required to effect the desired degree of oil removal.

What is claimed is:

1. A skimming device for removing from a body of liquids the upper of two stratified liquids having an interface, comprising an endless fine mesh screen, means for supporting said screen over the surface of said body of liquids with a lower portion thereof extending into said upper stratified liquid, said supporting means being arranged to position said lower portion of said screen substantially at said interface, means for continuously moving the screen through said upper liquid to accumulate said upper liquid in the mesh of said screen, blower means disposed above an upper portion of said screen to discharge said accumulated liquid therefrom, and collecting means disposed to collect said discharged liquid.

2. A device according to claim 1 in which the endless screen is a moveable belt of a fine mesh screen material.

3. A device according to claim 1, in which the endless screen is a cylinder of a fine mesh screen material, rotatably supported on a fixed shaft.

4. A device according to claim 1, in which the endless screen consists of a plurality of superimposed layers of such material in which each layer is distinctly separated from each adjoining layer.

5. A skimming device for removing the upper of two stratified liquids from a stream of such liquids, having an interface, and moving in a confined stream through a flow channel, comprising a rotatable cylinder of a corrosion resisting fine mesh screen material, substantially the width of said channel, fixed supports laterally of the channel rotatably carrying said cylinder transversely of the channel over the stream of liquids, said supports being arranged to position the lower portion of the cylinder surface substantially at the interface of the liquids in said stream, means for rotating said cylinder an inclined trough within said cylinder opening outwardly through one cylinder support, the side walls of said trough extending upwardly into closely spaced relation to the upper portion of the cylinder, an air blast member extending longitudinally of the cylinder over said upper portion and adapted to discharge a blast of air through the screen material mesh to expel accumulated liquid inwardly therefrom into the inclined trough, and means for rotating said cylinder.

JULES VERNER.

REFERENCES CITED

The following references are of record in the file of this patent:

UNITED STATES PATENTS

| Number | Name | Date |
|--------|------|------|
| 1,210,759 | Breddin | Jan. 2, 1917 |
| 1,262,146 | Ward | Apr. 9, 1918 |
| 1,346,060 | Rodriguez et al. | July 6, 1920 |
| 1,379,176 | Foster | May 24, 1921 |
| 1,554,943 | Antoine | Sep. 22, 1925 |
| 1,573,085 | Meiani | Feb. 16, 1926 |
| 1,576,374 | Spanner | Mar. 9, 1926 |
| 1,860,819 | Schamberger | May 31, 1932 |
| 1,981,310 | Currie | Nov. 20, 1934 |
| 2,031,589 | Burckhalter et al. | Feb. 25, 1936 |
| 2,117,273 | Brown | May 17, 1938 |
| 2,164,142 | Moore | June 27, 1939 |
| 2,405,838 | Lawson et al. | Aug. 13, 1946 |